United States Patent [19]
Hiratani

[11] Patent Number: 5,960,117
[45] Date of Patent: Sep. 28, 1999

[54] METHOD OF ADAPTIVE ARITHMETIC ENCODING/DECODING ACCORDING TO JBIG STANDARD

[75] Inventor: Yutaka Hiratani, Kanagawa, Japan

[73] Assignee: NEC Corporation, Tokyo, Japan

[21] Appl. No.: 08/928,682

[22] Filed: Sep. 12, 1997

[30] Foreign Application Priority Data

Sep. 12, 1996 [JP] Japan .................................. 8-242306

[51] Int. Cl.⁶ .................................................. H04N 1/417
[52] U.S. Cl. ........................ 382/239; 382/247; 382/238; 382/233; 382/232; 358/430; 358/261.2; 358/261.4; 358/426; 358/433
[58] Field of Search ................................... 382/238, 247, 382/239, 244, 232; 341/107; 358/261.2, 430, 261.4, 426, 433

[56] References Cited

U.S. PATENT DOCUMENTS

| | | |
|---|---|---|
| 5,392,362 | 2/1995 | Kimura et al. ........................ 382/232 |
| 5,491,564 | 2/1996 | Hongu ..................................... 358/430 |
| 5,736,947 | 4/1998 | Imanaka .................................. 358/426 |
| 5,745,245 | 4/1998 | Shibata ................................... 358/426 |
| 5,781,136 | 7/1998 | Imanaka .................................. 358/430 |
| 5,881,173 | 3/1999 | Ohmori ................................... 382/232 |

*Primary Examiner*—Edward L. Coles
*Assistant Examiner*—Cheuk Fan Lee
*Attorney, Agent, or Firm*—Foley, Hoag & Eliot LLP

[57] ABSTRACT

To reduce computational time of adaptive arithmetic encoding/decoding according to JBIG standard, a step (S21) of reading the learning table and a step (S22) of reading the prediction probability table in a pixel encoding step, which is performed when a context of all white can be applied, are omitted for a pixel following a preceding pixel whereof a normalization process (S27) is not performed, by making use of the prediction and the false approximation applied for the preceding pixel, in the method of invention.

11 Claims, 7 Drawing Sheets

METHOD OF ADAPTIVE ARITHMETIC ENCODING/DECODING ACCORDING TO JBIG STANDARD

BACKGROUND OF THE INVENTION

The present invention relates to a method of adaptive arithmetic coding, and particularly to that applied for encoding and decoding facsimile image data according to JBIG (Joint Bi-level Image Group) standard, namely the ITU-T recommendation T.85.

Data compression and expansion are usually applied for facsimile image data transmission in order to reduce information amount to be transmitted.

As an international standard of the data compression/expansion, a coding/decoding method called JBIG (facsimile version) is recommended formally as the recommendation T.85 in August 1995, by the ITU-TSS (International Telecommunication Union, Telecommunication Standardization Sector), wherein binary image data are compressed by way of adaptive arithmetic encoding calculating prediction probability of a binary pixel value referring to context defined by neighboring ten pixels.

FIG. 7 is a schematic diagram illustrating principle of the adaptive arithmetic encoding (hereafter abbreviated as the AAE).

In the AAE, a sequence of n binary values (white or black) is represented by a probability interval between maximum value and minimum value of appearance probability of the sequence, n being a positive integer. The probability interval is described by two binary fractions $A_n$ and $C_n$ between 0 to 1, $A_n$ being difference between the maximum value and the minimum value thereof represented by the minimum value $C_n$.

Referring to FIG. 7, at the beginning of encoding process, that is, when there is given no information of a sequence of pixels to be coded and so the probability interval is 0 to 1, a prediction (white) and its probability (false: $f_1$, true: $1-f_1$) for a first pixel P1 is given according to a context. At a first process $S_1$, where the first pixel P1 is found white, that is, the prediction is true, the probability interval becomes $A_1=1\times(1-f_1)$, which is represented by $C_1=0$, and a second prediction (white) and its probability $f_2$ is given according to revised context. The second prediction being true, the probability interval becomes $A_2=A_1\times(1-f_2)$, represented by $C_2=0$ at second process. When a prediction is found false at third process $S_3$, the probability interval becomes $A_3=A_2\times f_3$, which is represented by $C_3=A_2\times(1-f_3)$. In the same way, the probability interval becomes $A_4=A_3\times(1-f_4)$ represented by $C_4=C_3$ at process $S_4$ true, and $A_5=A_4\times f_5$ represented by $C_5=C_4+A_4\times(1-f_5)$ at process $S_5$ false.

Thus, a binary fraction $C_n$ between 0 to 1, specifying a unique sequence of n pixels, is obtained as encoded value of the sequence of n pixels. The longer the sequence is, the wider column number of the binary fraction $C_n$ becomes. However, the column number can be made narrower than the sequence length n of the pixels by applying appropriate predictions.

For decoding the binary fraction $C_n$, inverse calculation of the above encoding process is performed. For example, when $C_n$ is smaller than $A_1=1\times(1-f_1)$, the first prediction is known to be true and the first pixel P1 is determined as white at first process. Then, the binary fraction $C_n$ being between the second major interval 0 to $A_2=A_1\times(1-f_2)$, the second pixel P2 is found also white. At third process, the third pixel P3 is found black, since the binary fraction $C_n$ is larger than $C_3=A_2\times(1-f_3)$, similar processes following.

In the JBIG standard, the AAE is realized as follows.

The probability interval $A_i$ (i being a positive integer not more than n) is expressed by a hexadecimal less than 0×10000 and is controlled always not less than 0×8000 by a normalization. That is, when it becomes less than 0×8000, it is normalized together with the binary fraction, namely the temporary encoded value $C_i$, multiplied with 2, being shifted one bit left.

When the normalization is performed eight times, upper eight bits of the temporary encoded value $C_i$ are output as a part of the encoded value $C_n$ of the sequence of n pixels.

In a false process, where a prediction is found false, the probability interval $A_i$ is approximated independent of $A_{i-1}$ as:

$$A_i = A_{i-1} \times f_i \approx \bar{A} \times f_i = LSZ_i,$$

where $\bar{A}$ represents average probability density of the probability intervals, which are always normalized between 0×8000 to 0×10000, and the temporary encoded value $C_i$ is calculated as $C_i = C_{i-1} + A_i - LSZ_i$.

On the other hand, the probability interval $A_i$ is calculated as follows in a true process, the temporary encoded value $C_i = C_{i-1}$:

$$A_i = A_{i-1} \times (1-f_i) \approx \bar{A} \times (1-f_i) = A_{i-1} - LSZ_i.$$

In both processes true and false, the normalization is performed, as above described, when the probability interval $A_i$ becomes less than 0×8000. Further, when the prediction, which is pixel value more probable, is found false, the approximation $LSZ_i$ should be smaller than a half, that is less than 0×8000. Accordingly, the normalization is performed in every false process.

For dealing with exceptional cases, there are defined several additional rules in the JBIG standard, intricate description thereof, however, omitted here for simplification.

FIG. 6 is a schematic diagrams illustrating an array 61 of the neighboring ten pixels to be referred to, a context 62 defined by the array 61, a learning table 63 where a prediction M1 of one bit (white or black) and a status value M2 at present time are stored for each of possible $2^{10}$ contexts, and a prediction probability table 64, each defined in the JBIG standard for enabling the above approximation.

In the prediction probability table 64, a false approximation M3 giving the approximation $LSZ_i$ of the probability interval $A_i$ to be applied in a false process is prepared for each of 113 status values from 0 to 112, together with a next false status value M4, a next true status value M5 and a switch M6 to be used for adapting the learning table 63 when the normalization is occurred.

Now, usage of the array 61, the context 62, the learning table 63 and the prediction probability table 64 will be described in connection with a conventional AAE coder, referring to FIGS. 2 to 6.

FIG. 2 is a block diagram illustrating a principal configuration of the conventional AAE coder, comprising;

a CPU (Central Processing Unit) 100 for taking charge of arithmetic operation, data processing, control of other parts, and so on.

an image data memory 400 for storing binary image data obtained by scanning a manuscript to be transmitted, a code data memory 500 for storing received code data, a ROM (Read Only Memory) 200 where the prediction probability table 64 of FIG. 6 and a JBIG program 201 are prepared, a learning table memory 300 where contents of the learning table 63 are to be written, a FIFO (First-In-First-Out) memory 600 for buffering encoded code data or decoded image data, and a bus 700 for connecting each of the above parts. The CPU 100 includes;

a first register 101 for storing a temporary encoded value C, a second register 102 for storing a binary value of the context 62 of FIG. 6, a third register 103 for storing a block of data of a line to be coded read out from the image data memory 400, a fourth register 104 for storing data of corresponding block of a first preceding line of the line to be coded, a fifth register 105 for storing data of corresponding block of a second preceding line of the line to be coded, a sixth register 106 for storing a probability interval A and the false approximation M3 read out from the prediction probability table 64, and a seventh register 107 for storing the prediction M1 and the status value M2 read out from the learning table 63.

At beginning of the AAE of binary image data of a manuscript, the prediction M1 and the status value M2 for every of the $2^{10}$ possible contexts in the learning table 63 are initialized to '0', for example, indicating the prediction 'white' and the initial status.

FIG. 3 is a flow chart illustrating operational flow for encoding the binary image data of a line according to the conventional AAE coder of FIG. 2.

At START of the encoding, the probability interval A and the temporary encoded value C are initialized to 0×10000 and 0, respectively, and if the concerning line is a first line, the learning table 63 is also initialized as above described.

First, a block of the binary image data of each of concerning line, its preceding line and its next preceding line is read out from the image data memory 400 to be stored into corresponding each of the third, fourth and fifth registers 103, 104 and 105 (at step S41). When there is no preceding line, it is substituted with a sequence of '0' bits.

Then, the context 62 is prepared from the array 61 of neighboring ten pixels (bits), composed of nearest three pixels of the next preceding line, nearest five pixels of the preceding line and preceding two pixels of the concerning line for a concerning pixel (at step S45, steps S42 to S44 being described afterwards), as illustrated in FIG. 6. When the concerning pixel is the beginning of a line, for example, and there is not any corresponding pixel, it is regarded as '0' (white).

Then, pixel processing of the concerning pixel is performed (at step S46) referring to the context.

By repeating steps S45 and S46 by shifting the concerning pixel bit by bit (at step S48), from left to right of the block of the binary image data of the concerning line stored in the third register 103, until end of the block is found (at step S47), coding of the block is performed, and by repeating steps S40, S41, and steps S45 to S48, block by block from left to right until end of the concerning line is found (at step S40), coding of the concerning line is performed.

Now, detailed processes of the pixel processing performed in step S46 are described referring to a flowchart of FIG. 4 and the schematic diagram of FIG. 6.

The context 62 is prepared by ranging the three neighboring bits of the next preceding line, the five neighboring bits of the preceding line and the two neighboring bits of the concerning line in this order as shown in FIG. 6.

Referring to FIG. 4, the prediction M1 and the status value M2 is retrieved first (at step S21) from an entry of the learning table 63 indicated by the context, which is indexed according to $2^{10}$ possible contexts.

Then, the false approximation M3 is read out (at step S22) from the prediction probability table 64 together with the next false status value M4, the next true status value M5 and the switch M6 corresponding to the status value M2, making use of the status value M2 as the index of the prediction probability table 64.

Then (at step S23), the probability interval A is revised to A−M3 (which is revised again to M3 afterwards in false process S25).

Then, it is checked whether the prediction is true or false, that is whether the concerning bit (pixel) coincides with the prediction M1 or not (at step S24).

When the prediction is false, a false process is performed (at step S25), where;

the probability interval A is added to the temporary encoded value C, the probability interval A is revised again to the false approximation M3, the status value M2 of the learning table 63 corresponding to the concerning context 62 is replaced with the next false status value M4, and the prediction M1 of the learning table 63 corresponding to the concerning context 62 is inverted when the switch MG is 1.

And, a normalization process is performed (at step S27), as the probability interval A=M3 is less than 0×8000.

When the prediction is found true at step S24, it is checked whether the probability interval A<0×8000 (at step S29). When A ≮ 0×8000, the pixel processing (step S46 of FIG. 3) of the concerning pixel ends, the temporary encoded value C remaining as it is.

When A<0×8000, the normalization process of step S27 is performed after a true process (at step S26), wherein the status value M2 of the learning table 63 corresponding to the concerning context 62 is replaced with the next true status value M5, and the prediction is inverted when the switch M6 is 1.

In the normalization process at step S27, bits of both the probability interval A and the temporary encoded value C are shifted leftwards by one bit and a count number CT is incremented by one, which is repeated until the probability interval A becomes not less than 0×8000. When the count number attains to eight during the above repeating, upper eight bits of the temporary encoded value C are output as a part of coded data to the FIFO memory 600, resetting the count number CT to 0.

Thus, the encoding of the binary data according to the AAE is performed pixel by pixel, preparing the context 62, referring to the learning table 63 and the prediction probability table 64 for each pixel.

However, manuscripts to be transmitted by way of facsimile device generally include many white spaces. Therefore, load of the preparation of the context 62 at step S45 is reduced by making use of these white spaces, in the coding method of the conventional AEE coder of FIG. 3. Steps S42 to S44 is provided for the purpose.

After the three blocks of the binary image data are read out at step S41, it is checked (at step S42) whether all pixels of the three blocks are white or not. When they are all white, that is, all '0', the context 62 remains 0 until end of the concerning block. So, a pixel processing step S43, which is the same with that of step S46, is repeated for each pixel of the block without revising the context 62 until end of the block is found at step S44. Thus, processes at steps S48 and S45 for preparing the context 62 are omitted when data of three blocks are all '0', reducing operational load.

Decoding of the coded data is performed in a similar way to the operational flow of FIG. 3, and is described referring to FIG. 5.

Before decoding transmitted coded data, the prediction M1 and the status value M2 for every of the $2^{10}$ possible contexts in the learning table 63 are initialized to '0', in the same way with the coding operation. At START of each line decoding process, the probability interval A is initialized to 0×10000, and three bytes, 24 bits, of coded data to be decoded are set in the first register 101 read out from the code data memory 500 and upper two bytes are treated as a temporary decoding value C.

At step S51, the third register 103, where decoded bits will be written, is initialized to 0, and each of corresponding blocks of the binary image data of two preceding lines of the line to be decoded is read out from the image data memory 400 to be stored into corresponding each of the fourth and fifth registers 104 and 105. When there is no preceding line, it is substituted with a sequence of '0' bits.

Then, it is checked whether both the two blocks stored in the registers 104 and 105 are 0 or not (at step S52).

When any bit of the two blocks is not '0', the context 62 is prepared from the array 61 of neighboring ten pixels (bits), composed of nearest three pixels of the next preceding line, nearest the preceding the preceding line and preceding two decoded pixels of the concerning line for a concerning pixel to be decoded, in a similar way with the encoding of FIG. 3.

Referring to the context, a pixel processing of the concerning pixel is performed (at step S56), and a decoded bit is written in the third register 103 sequentially form left to right.

Steps S55 and S56 are repeated until the block end, that is, the third register is filled with the decoded bits, revising the context 62 by shifting position of the concerning pixel to be decoded, bit by bit (at step S58), and the decoded bits are output to be buffered in the FIFO memory 600.

When the two blocks is found to be 0 at step S52, the pixel processing of the concerning pixel is started (at step S53) with the context 62 being set to 0 and is repeated until a decoded bit is found to be '1', black, (at step S59), or the block end is found (at step S54). When a decoded bit is found to be '1' at step S59, the process flow goes to step S57 and the decoding of coded data for the block is continued each time revising the context 62 at step S55 by shifting position of the concerning pixel to be decoded, bit by bit, as above described.

Detailed processes of the pixel processing performed at step S56 and S53 are similar to pixel processing performed at steps S46 and S43 described in connection with the flowchart of FIG. 4, and will be described also referring to FIG. 4.

At steps S21 to S23, the prediction M1 and the status value M2 is retrieved from the learning table 63 according to the context 62. Then, the false approximation M3, the next false status value M4, the next true status value M5 and the switch M6 is retrieved according to the status value M2 from the prediction probability table 64. The probability interval A is revised to A−M3 at step S23.

Then, it is checked whether the prediction is true or false, that is whether the concerning bit (pixel) is to be decoded as the same with the prediction M1 or not (at step S24). When A>C, the prediction M1, '0' for example, is determined to be true, and the concerning bit is decided to '0', while it is decided to be inverse logic of the prediction M1, '1' in the example, when A$\rho$C.

When the prediction is false, a false process is performed (at step S25), where;

the probability interval A is reduced from the temporary decoding value C, the probability interval A is revised once more to the false approximation M3, the status value M2 of the learning table 63 corresponding to the concerning context 62 is replaced with the next false status value M4, and the prediction M1 of the learning table 63 corresponding to the concerning context 62 is inverted when the switch M6 is 1.

And, a normalization process is performed (at step S27).

When the prediction is determined to be true at step S24, it is checked whether the probability interval A<0×8000 (at step S29). When A ≮ 0×8000, the pixel processing (step S56 or S53 of FIG. 4) of the concerning pixel ends, the temporary encoded value C remaining as it is.

When A<0×8000, the normalization process of step S27 is performed after a true process (at step S26), wherein the status value M2 of the learning table 63 corresponding to the concerning context 62 is replaced with the next true status value M5.

In the normalization process at step S27, bits of both the probability interval A and the temporary decoding value C are shifted leftwards by one bit and a count number CT is incremented by one, which is repeated until the probability interval A becomes not less than 0×8000. When the count number attains to eight during the above repeating, one byte, 16 bits, is read out from the code data memory 500 to be replaced with eight lower '0' bits of the first register 101 generated by the shifting up of the temporary decoding value C, resetting the count number CT to 0.

Thus, the decoding of the coded data according to the AAE is performed pixel by pixel.

The learning table 63 is initialized at the beginning of both the encoding and the decoding. It is revised every time when the normalization is performed, but each normalization should occur in both the encoding and the decoding when the same corresponding pixel is processed with the same status value. Therefore, the same binary image data can be decoded. And, the learning table 63 is optimized in the same way along with the encoding and the decoding, by preparing the prediction probability table 64 appropriately.

However, conventional AAE coders had a problem that a certain computational time is needed for processing in real time. In the conventional method described in connection with FIGS. 3 to 5, the contents of the three/two blocks are checked at step S42/S52 for reducing computational load of preparing the context 62 when the context having a value 0 can be applied. However, the learning table 63 and the prediction probability table 64 are retrieved every time when a pixel is encoded or decoded, still needing a considerable load.

SUMMARY OF THE INVENTION

Therefore, a primary object of the present invention is to realize a method of adaptive arithmetic encoding/decoding according to JBIG standard by software wherein computational load is reduced as much as possible.

In order to achieve the object, in a method of the invention of adaptive arithmetic encoding according to a JBIG standard for encoding a block of binary image data of a concerning line by repeating a context preparation step and a first pixel processing step for each bit of the block when any bit of the block of binary image data of the concerning line and the corresponding blocks of binary image data of the two lines preceding the concerning line is '1', and by repeating a second pixel processing step for each bit of the block when every bit of the block of binary image data of the concerning line and the corresponding blocks of binary image data of the two lines preceding the concerning line is '0'; said first pixel processing step and said second pixel processing step including a step of reading a learning table for obtaining a prediction and a status value corresponding to the context, a step of reading a prediction probability table for obtaining a false approximation and revision data for revising the learning table corresponding to the status value, and a step of pixel processing wherein a probability interval is revised according to the false approximation and a normalization process, including revision of the leaning table according to the revision data, is performed when the probability interval becomes less than a predetermined value;

the step of reading the learning table and the step of reading the prediction probability table in the second pixel processing step are omitted for a bit of the block following a preceding bit whereof the normalization process is not performed by making use of the prediction and the false approximation applied for said preceding bit.

And, in a method of invention of adaptive arithmetic decoding according to a JBIG standard for decoding coded data of a block of binary image data of a concerning line by repeating a context preparation step and a first pixel processing step for each bit to be decoded of the block when any bit of the corresponding blocks of binary image data of the two lines preceding the concerning line is '1' and for each bit to be decoded following a decoded bit having logic '1', and by repeating a second pixel processing step for each bit of the block until a decoded bit is found to have logic '1' when every bit of the corresponding blocks of binary image data of the two lines preceding the concerning line is '0'; said first pixel processing step and said second pixel processing step including a step of reading a learning table for obtaining a prediction and a status value corresponding to the context, a step of reading a prediction probability table for obtaining a false approximation and revision data for revising the learning table corresponding to the status value, and a step of pixel processing wherein a probability interval is revised according to the false approximation and a normalization process, including revision of the leaning table according to the revision data, is performed when the probability interval becomes less than a predetermined value;

the step of reading the learning table and the step of reading the prediction probability table in the second pixel processing step are omitted for a bit to be decoded of the block following a preceding decoded bit whereof the normalization process is not performed by making use of the prediction and the false approximation applied for said preceding decoded bit.

Therefore, computational load for the AAE can be remarkably reduced in the method according to the invention, especially when it is applied for encoding/decoding binary image data of a facsimile manuscript having many white spaces.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
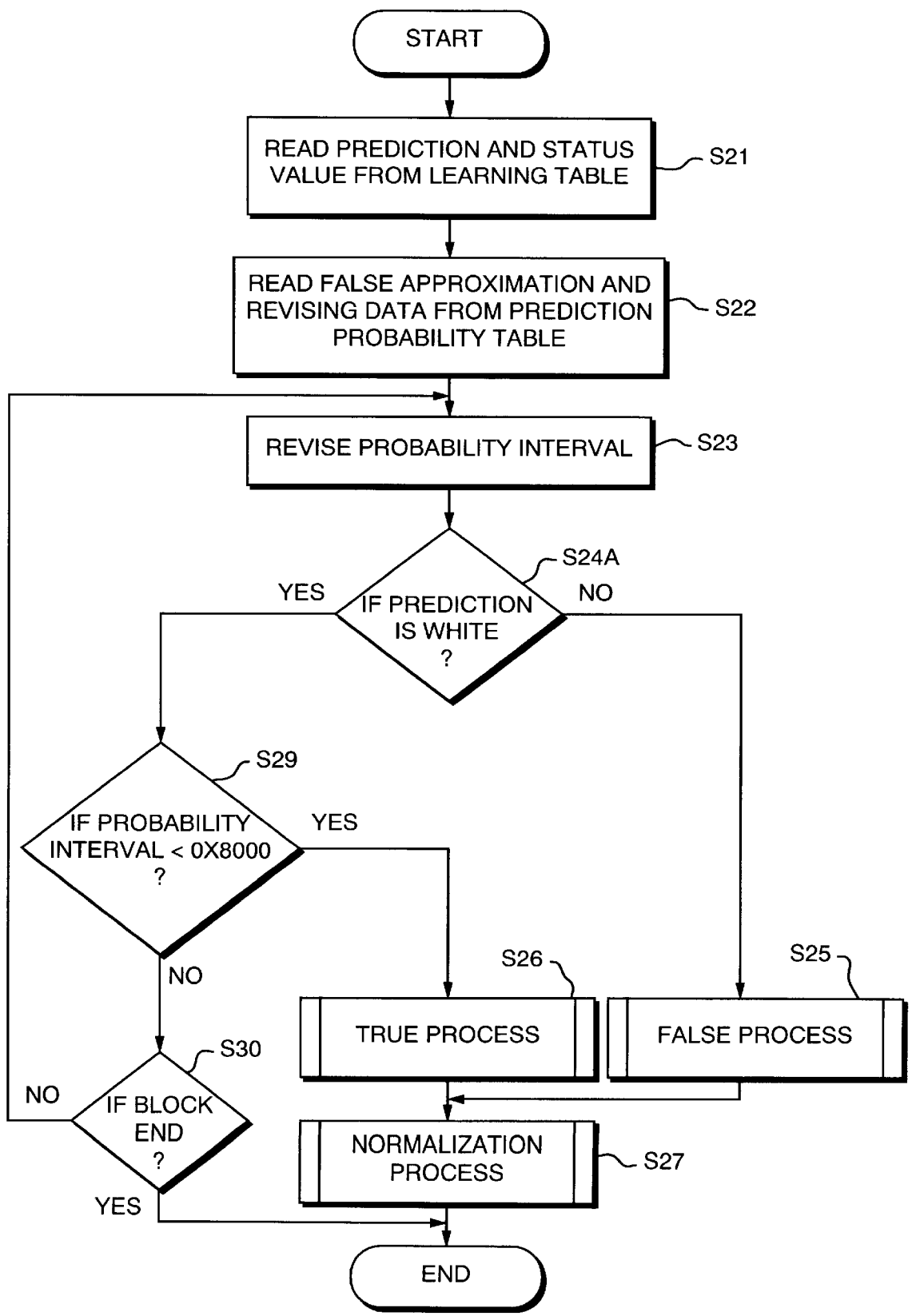
FIG. 1 is a flowchart illustrating a part of a method of adaptive arithmetic encoding/decoding of the embodiment according to JBIG standard.

FIG. 1 is a flowchart illustrating a part of a method of adaptive arithmetic encoding/decoding of the embodiment according to JBIG standard.

Figure 2:
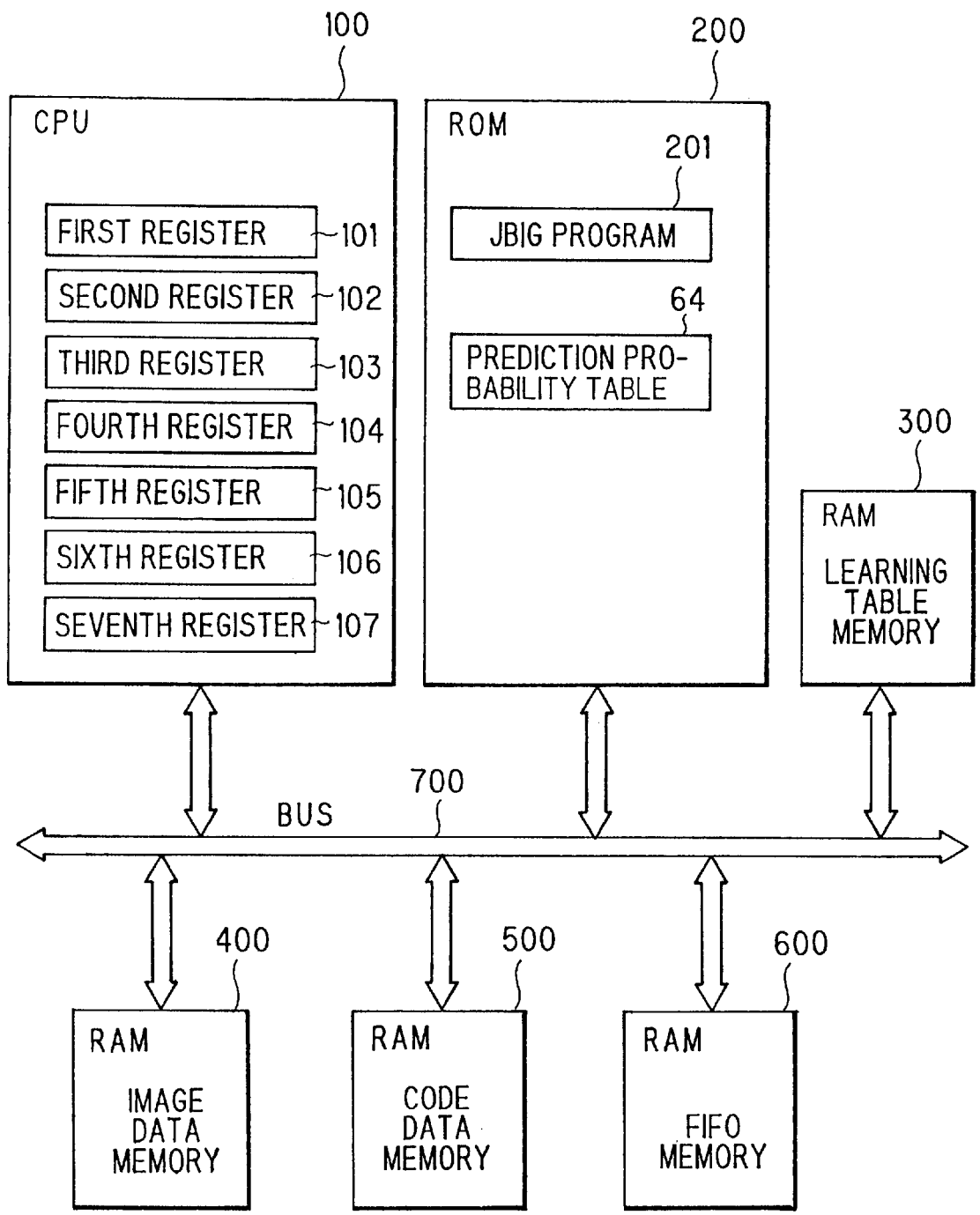
FIG. 2 is a block diagram illustrating a principal configuration of an AAE coder.

As for hardware for realizing the embodiment, it may be the same with the conventional AAE coder described in connection with FIG. 2, and principal flow is also the same with that of the conventional AAE coder described in connection with FIG. 3 and FIG. 5. So, duplicated descriptions are omitted.

Figure 3:
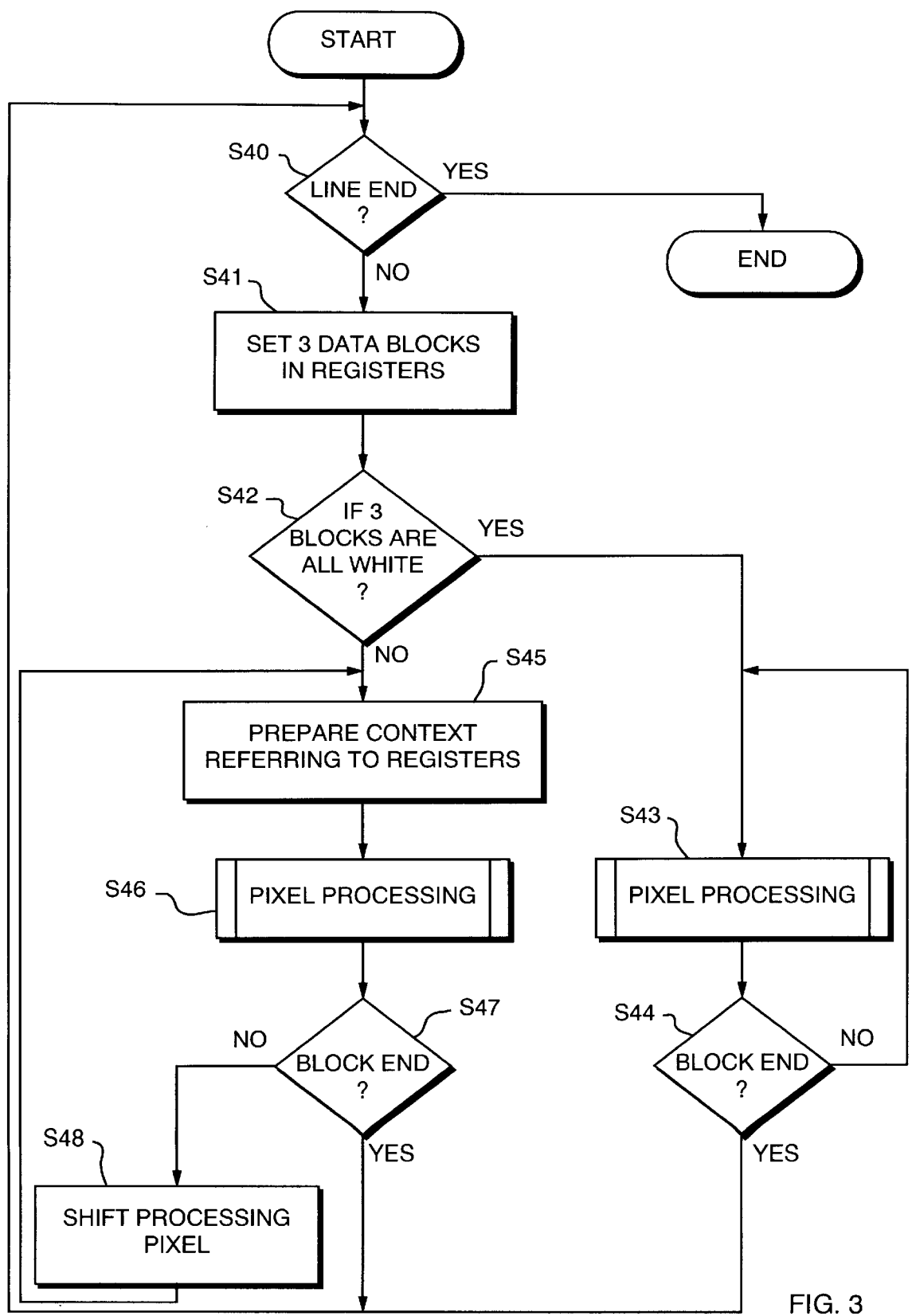
FIG. 3 is a flow chart illustrating operational flow for encoding the binary image data of a line.
Figure 4:
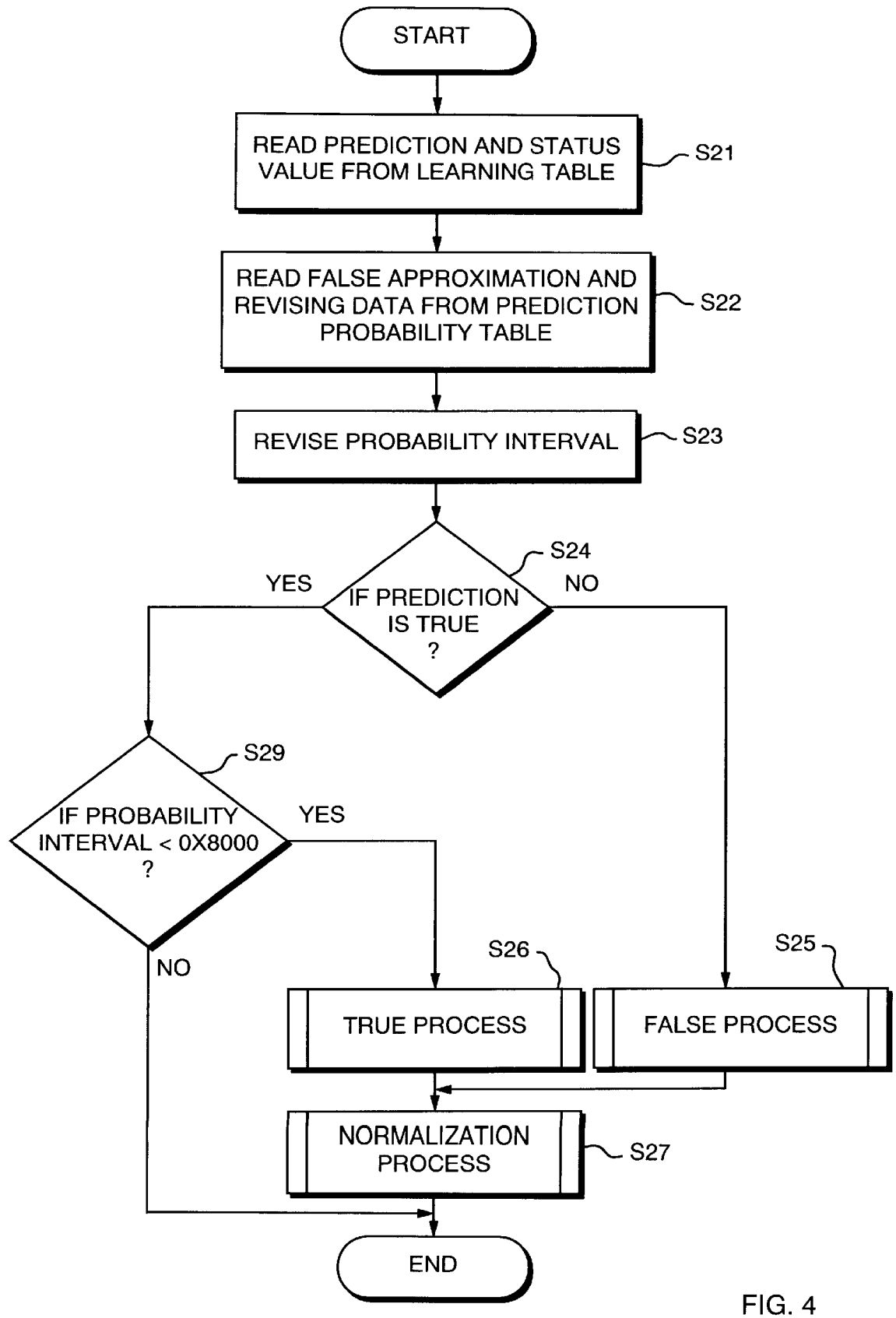
FIG. 4 is a flowchart illustrating detailed processes of the pixel processing of a prior art.
Figure 5:
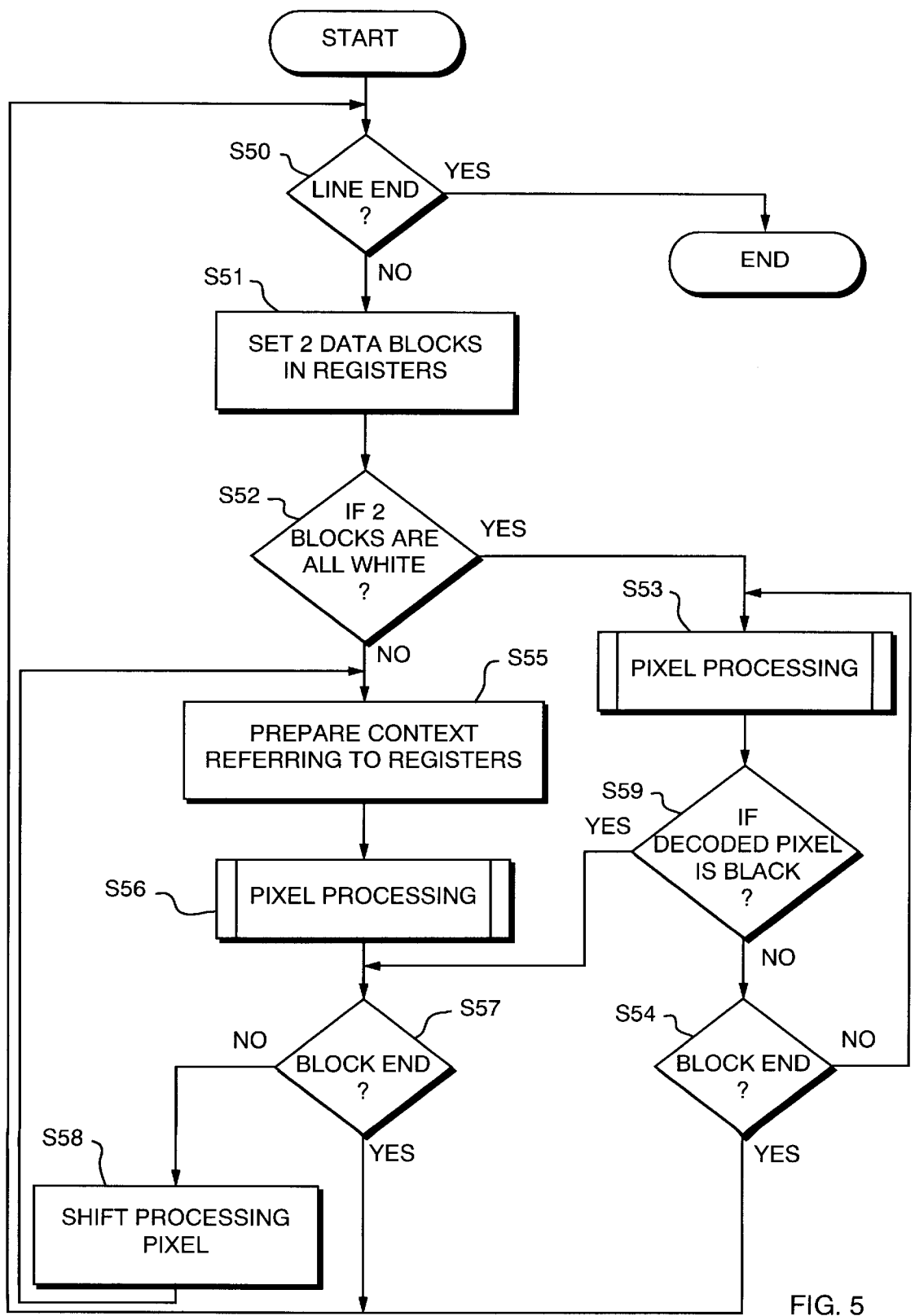
FIG. 5 is a flow chart illustrating operational flow for decoding the binary image data of a line.
Figure 6:
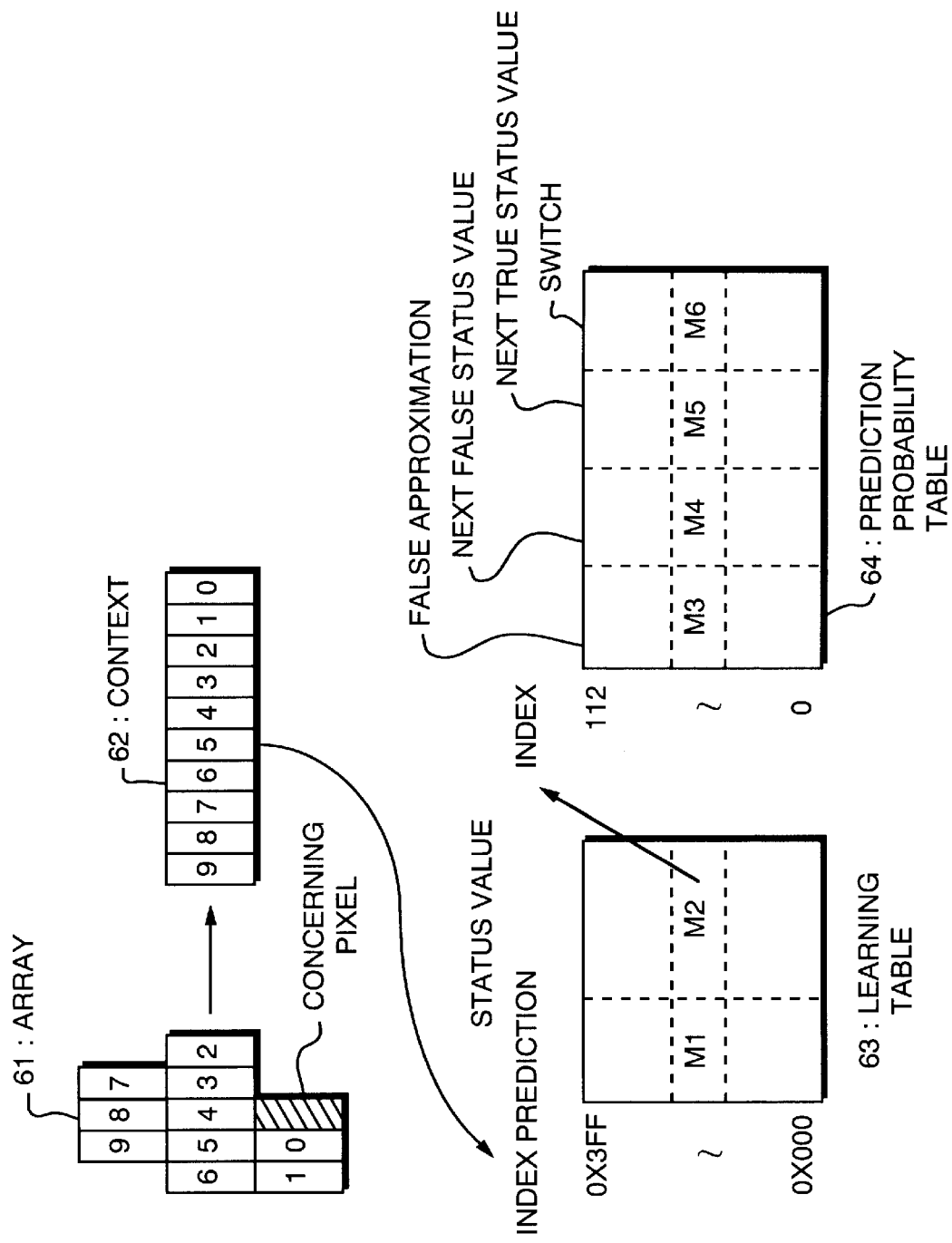
FIG. 6 is a schematic diagrams illustrating an array 61 of the neighboring ten pixels to be referred to, a context 62 defined by the array 61, a learning table 63 and a prediction probability table 64, each defined in the JBIG standard.
Figure 7:
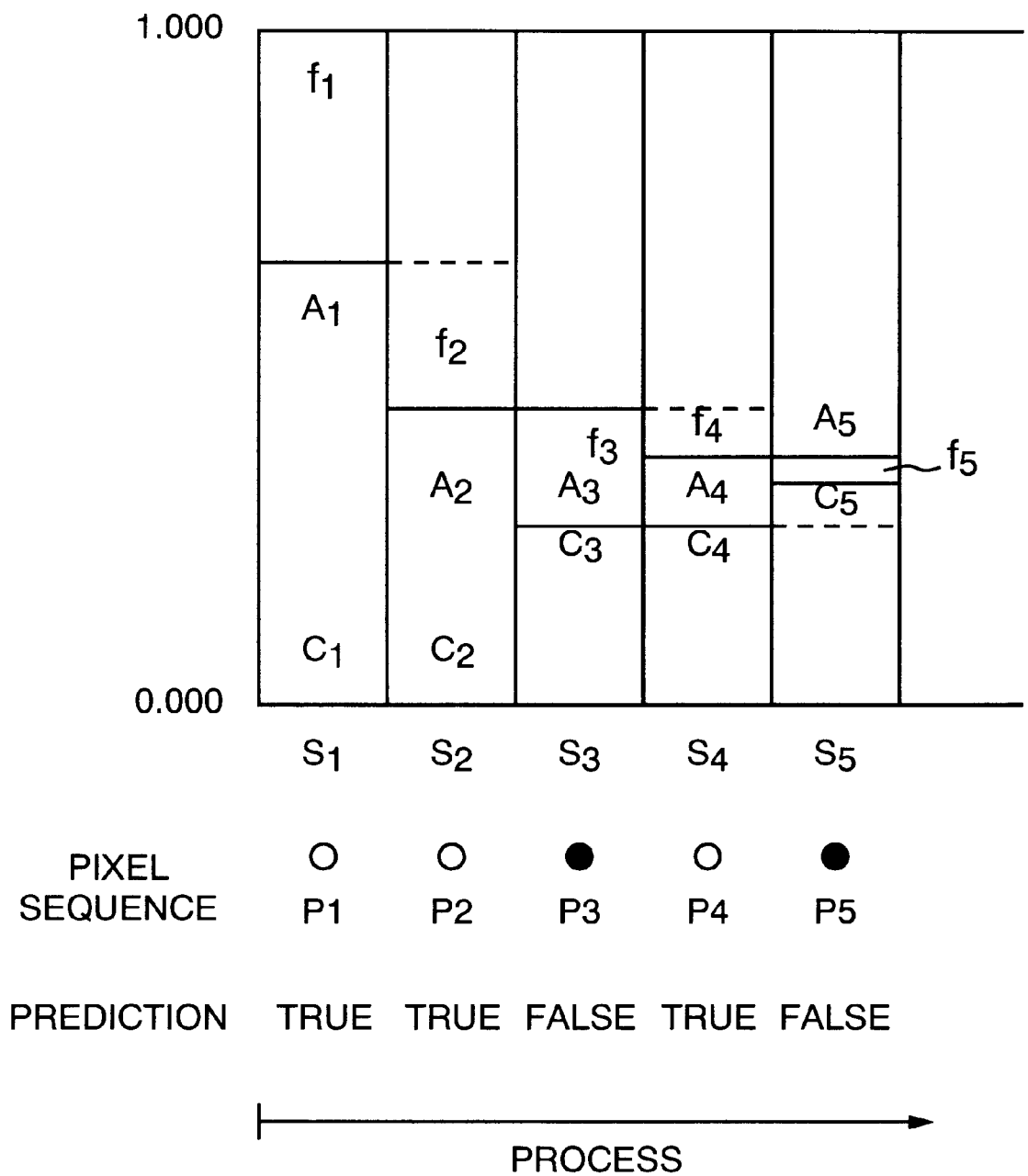
FIG. 7 is a schematic diagram illustrating principle of the adaptive arithmetic encoding.

The flowchart of FIG. 1 corresponds to the flowchart of FIG. 4, which is performed at steps S43 and S46, or S53 and S56 of FIG. 3 or FIG. 5, in the conventional AAE coder.

In the embodiment, the pixel processing at step S46/S56, which is performed when the context 62 is revised at step S45/S55, may be performed according to the flowchart of FIG. 4, in the same way with the conventional AAE coder. However, the pixel processing at step S43/S53, where the same context can be applied, is performed following the flowchart of FIG. 1, in the embodiment.

Referring to FIG. 1, pixel processing performed at step S43 of encoding process of FIG. 3 is now described.

First, the prediction M1 and the status value M2 is retrieved (at step S21) from an entry of the learning table 63 indicated by the context 0, having ten '0' bits.

Then, the false approximation M3 is read out (at step S22) from the prediction probability table 64 together with the next false status value M4, the next true status value M5 and the switch M6 corresponding to the status value M2, making use of the status value M2 as the index of the prediction probability table 63.

Then (at step S23), the probability interval A is revised to A−M3 (which is revised again to M3 afterwards in false process S25).

Then, it is checked whether the prediction is true or false, that is whether the prediction M1 is 0, white, or not (at step S24A). Here, it is noted that when the three blocks of the concerning line and the two preceding lines have been all '0' for many blocks to be encoded, that is, when there are many white spaces in a facsimile manuscript, the prediction M1 should remain to be '0' with a high probability, namely, with a small value of the false approximation M3.

When the prediction is false, a false process is performed (at step S25) in the same way with the conventional AAE of FIG. 4, followed by the normalization process (at step S27).

When the prediction is found true at step S24, it is checked whether the probability interval A<0×8000 (at step S29). When A<0×8000, the normalization process of step S27 is performed after a true process (at step S26), wherein the status value M2 of tile learning table 63 corresponding to the concerning context 62 is replaced with the next true status value M5, and the prediction is inverted when the switch M6 is 1, in the same way.

When A ≮ 0×8000, it is checked (at step S30) whether the encoding process of the concerning block is accomplished or not, in the embodiment. When it is found not accomplished at step S30, the processing flow is returned to step S23 without performing step S21 nor S22 for retrieving the prediction M1 and the status value M2 from the learning table 63 or reading out the false approximation M3, the next false status value M4, the next true status value M5 and the switch M6 from the prediction probability table 64. This is because that the prediction M1 and the status value M2, accordingly the false approximation M3, the next false status value M4, the next true status value M5 and the switch M6 don't vary when the normalization is not performed.

Thus, the computational load is reduced in the embodiment by omitting step S21 of reading the learning table 63 and step S22 of reading the prediction probability table.

This is the characteristic feature of the invention.

Heretofore, the embodiment is described in connection with the encoding process of FIG. 3. However, it can be easily understood that the process flow of FIG. 1 is able to be applied in the same way for step S53 of pixel processing of the decoding process of FIG. 5, and duplicated description is omitted.

As above described, when there are many white spaces in a facsimile manuscript, the prediction M1 should remain to be '0' with a small value of the false approximation M3. Therefore, the computational time can be remarkably reduced, especially for such a facsimile manuscript, by applying the method of the invention for the adaptive arithmetic encoding/decoding according to JBIG standard.

What is claimed is:

1. A method of adaptive arithmetic encoding according to a JBIG (Joint Bi-level Image Group) standard for encoding a block of binary image data of a concerning line by repeating a context preparation step for preparing a context from logic of ten bits neighboring to a processing bit of the block referring to bits in the block of the processing bit and bits of corresponding blocks of binary image data of two lines preceding the concerning line, and a first pixel processing step for each bit of the block when any bit of the block of binary image data of the concerning line and the corresponding blocks of binary image data of the two lines preceding the concerning line is '1', and by repeating a second pixel processing step for each bit of the block when every bit of the block of binary image data of the concerning line and the corresponding blocks of binary image data of the two lines preceding the concerning line is '0'; said first pixel processing step and said second pixel processing step including a step of reading a learning table for obtaining a prediction and a status value corresponding to the context, a step of reading a prediction probability table for obtaining a false approximation and revision data for revising the learning table corresponding to the status value, and a step of probability revision wherein a probability interval is revised according to the false approximation and a normalization process, including revision of the leaning table according to the revision data, is performed when the probability interval becomes less than a predetermined value; said method characterized in that:

the step of reading the learning table and the step of reading the prediction probability table in the second pixel processing step are omitted for a bit of the block following a preceding bit whereof the normalization process is not performed by making use of the prediction and the false approximation applied for said preceding bit.

2. The method of adaptive arithmetic encoding recited in claim 1, said step of probability revision of said second pixel processing step comprising:

a step of revising the probability interval according to the false approximation;

a step of prediction checking for detecting if the prediction is '0';

a step of false processing performed when the prediction is not '0' for revising the learning table according to the revision data;

a step of probability interval checking performed when the prediction is '0' for detecting if the probability interval is less than said predetermined value;

a step of block end checking performed when the probability interval is not less than said predetermined value for repeating said step of revising, said step of prediction checking and said step of probability interval checking during the probability interval is not less than the predetermined value and pixel processing of the block does not end;

a step of true processing performed when the prediction is '0' and the probability interval is less than said predetermined value for revising the learning table according to the revision data; and a step of normalization processing performed after said step of true processing and said step of false processing for normalizing the probability interval to be not less than said predetermined value.

3. A method of adaptive arithmetic decoding according to a JBIG standard for decoding coded data of a block of binary image data of a concerning line by repeating a context preparation step for preparing a context from logic of ten bits neighboring to a processing bit to be decoded of the block referring to decoded bits in the block preceding the processing bit and bits of corresponding blocks of binary image data of two lines preceding the concerning line, and a first pixel processing step for each bit to be decoded of the block when any bit of the corresponding blocks of binary image data of the two lines preceding the concerning line is '1' and for each bit to be decoded following a decoded bit having logic '1', and by repeating a second pixel processing step for each bit of the block until a decoded bit is found to have logic '1' when every bit of the corresponding blocks of binary image data of the two lines preceding the concerning line is '0'; said first pixel processing step and said second pixel processing step including a step of reading a learning table for obtaining a prediction and a status value corresponding to the context, a step of reading a prediction probability table for obtaining a false approximation and revision data for revising the learning table corresponding to the status value, and a step of probability revision wherein a probability interval is revised according to the false approximation and a normalization process, including revision of the leaning table according to the revision data, is performed when the probability interval becomes less than a predetermined value; said method characterized in that:

the step of reading the learning table and the step of reading the prediction probability table in the second pixel processing step are omitted for a bit to be decoded of the block following a preceding decoded bit whereof the normalization process is not performed by making use of the prediction and the false approximation applied for said preceding decoded bit.

4. The method of adaptive arithmetic decoding recited in claim 3, said step of probability revision of said second pixel processing step comprising:

a step of revising the probability interval according to the false approximation;

a step of prediction checking for detecting if the prediction is '0';

a step of false processing performed when the prediction is not '0' for revising the learning table according to the revision data;

a step of probability interval checking performed when the prediction is '0' for detecting if the probability interval is less than said predetermined value;

a step of block end checking performed when the probability interval is not less than said predetermined value for repeating said step of revising, said step of prediction checking and said step of probability interval checking during the probability interval is not less than the predetermined value and pixel processing of the block does not end;

a step of true processing performed when the prediction is '0' and the probability interval is less than said predetermined value for revising the learning table according to the revision data; and a step of normalization processing performed after said step of true processing and said step of false processing for normalizing the probability interval to be not less than said predetermined value.

5. A method of transforming a block of binary data, comprising:

(a) preparing a context for a portion of the data, the context corresponding to a subset of the binary data in proximity to the portion and the context remaining constant for the portion and for subsequent portions when subsets of the binary data in proximity to the subsequent portions correspond to the subset of the binary data in proximity to the portion;

(b) determining a current prediction and a current status value that varies according to the context;

(c) using the current status value to obtain a false approximation value and revision data;

(d) revising a probability interval according to the false approximation value;

(e) in response to the current prediction for the portion being false, revising the prediction and the current status value according to the revision data; and (f) in response to the current prediction for the portion being true, the context remaining constant indicating the presence of white space, and the probability interval being greater than a predetermined value, reusing the current prediction and the current status value for processing a subsequent portion of the binary data.

6. A method according to claim 5, wherein the portion is a single bit of binary data that represents a pixel and the subsequent portions of the binary data represent pixels on a line containing the pixel represented by the portion.

7. A method according to claim 6, wherein the context varies according to three pixels that are two lines above the pixel represented by the portion, five pixels that are one line above the pixel represented by the portion, and two pixels that immediately precede the pixel represented by the portion.

8. A method according to claim 5, wherein determining a current prediction and a current status value includes accessing a learning table.

9. A method according to claim 5, wherein the false approximation value and the revision data are obtained by accessing a prediction probability table.

10. A method according to claim 5, wherein the context remains constant indicating the presence of white space in response to both the subset of binary data in proximity to the portion and the subsets of binary data in proximity to the subsequent portions indicating the presence of white space.

11. A device for transforming a block of binary data, comprising:

(a) first means, for preparing a context for a portion of the data, the context corresponding to a subset of the binary data in proximity to the portion and remaining constant for the portion and for subsequent portions when subsets of the binary data in proximity to the subsequent portions correspond to the subset of the binary data in proximity to the portion;

(b) second means, coupled to the first means, for determining a current prediction and a current status value that varies according to the context;

(c) third means, coupled to the second means, for using the status value to obtain a false approximation value and revision data;

(d) fourth means, coupled to the third means, for revising a probability interval according to a previous value of the probability interval and the false approximation value;

(e) fifth means, coupled to the second means, for sensing if the current prediction is true;

(f) sixth means, coupled to the third means and the fifth means, for revising the current prediction and the current status value according to the revision data, in response to the prediction for the portion being false; and (g) seventh means, coupled to the first means, the fourth means and the fifth means, in response to the current prediction for the portion being true, the context remaining constant indicating the presence of white space, and the probability interval being greater than a predetermined value, for processing a subsequent portion of the binary data by reusing the current prediction and the current status value.

* * * * *